United States Patent Office 3,272,476
Patented Sept. 13, 1966

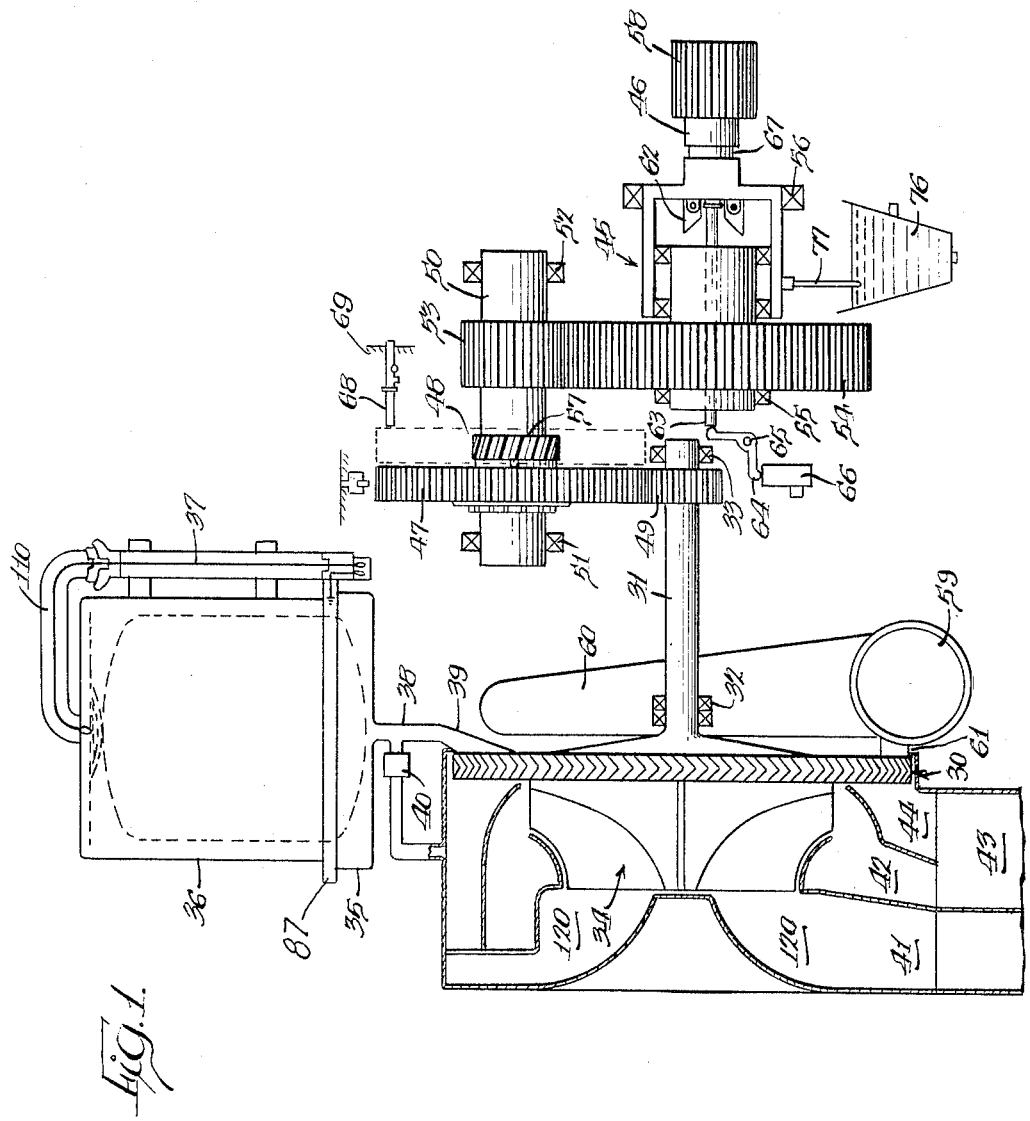

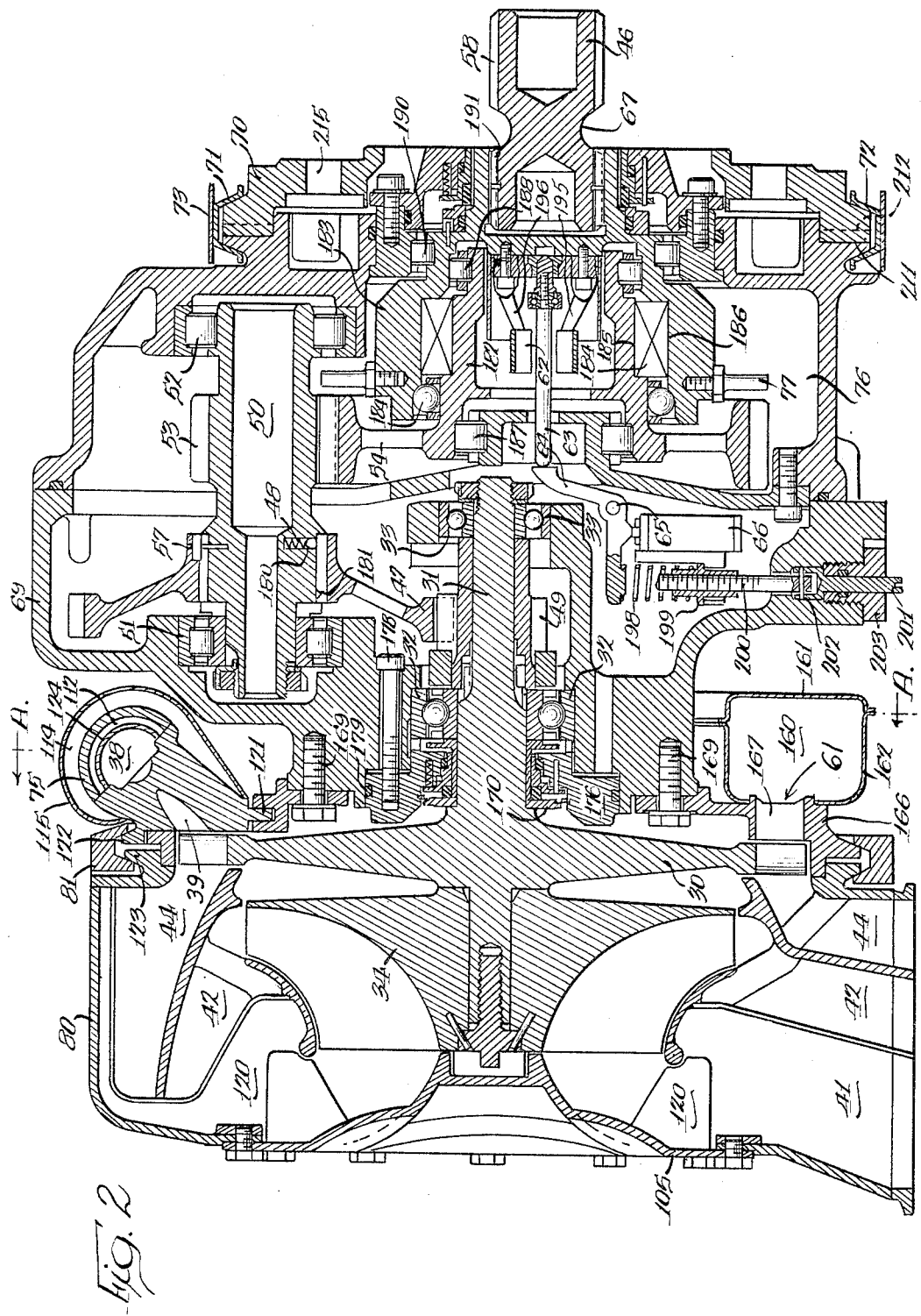

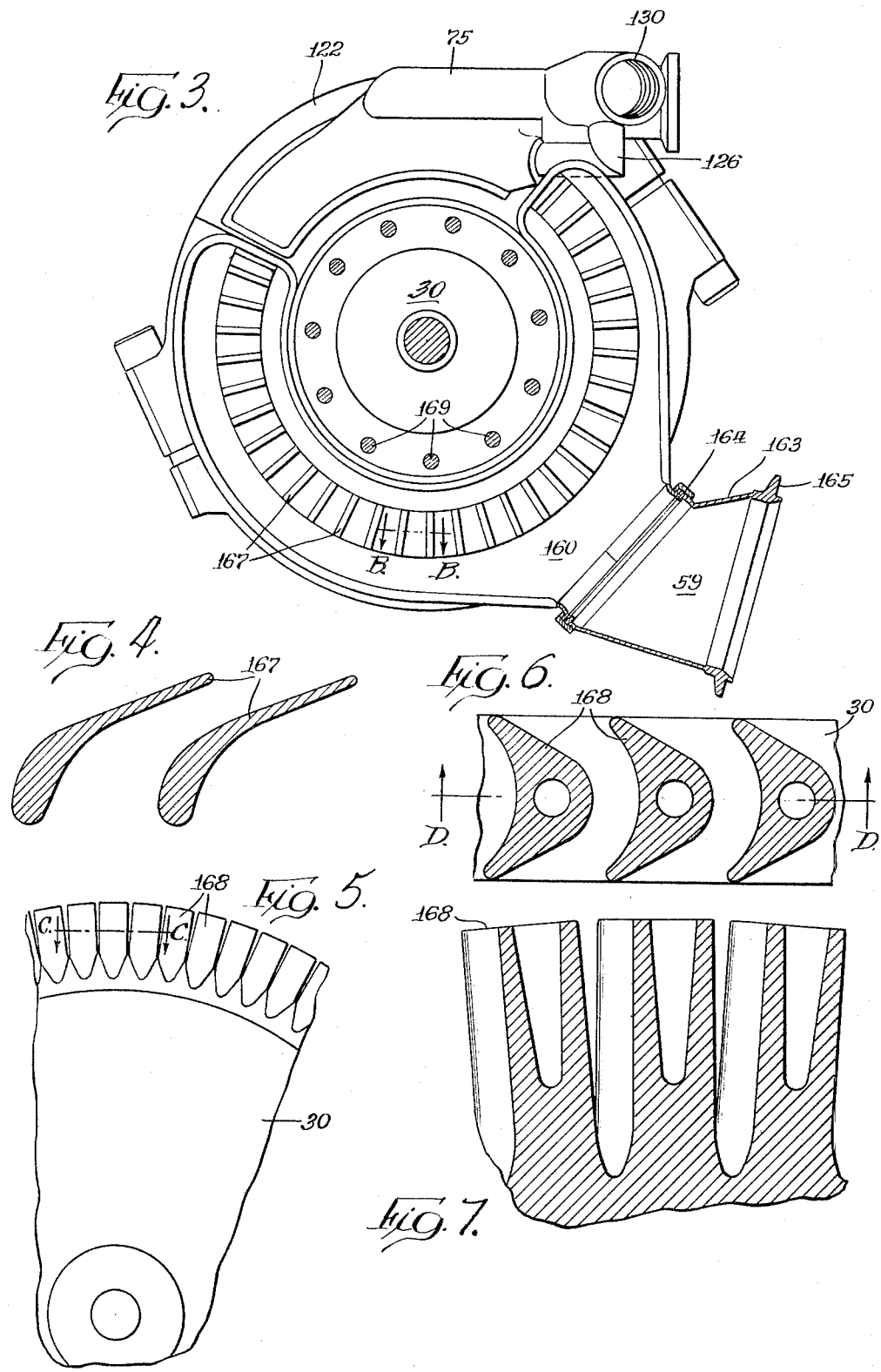

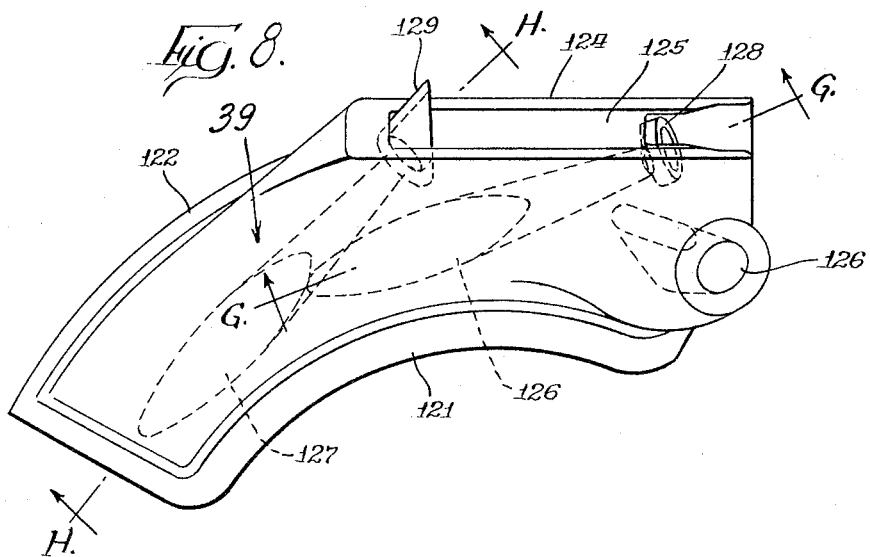
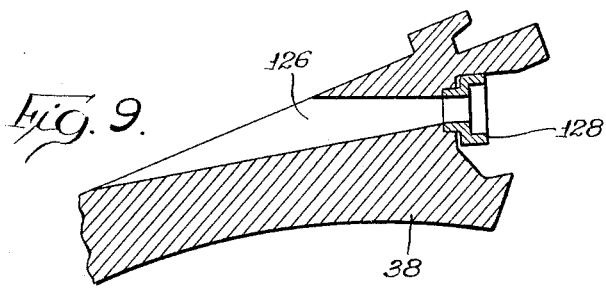
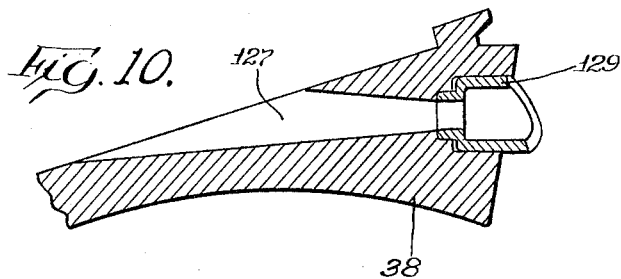

3,272,476
ENGINE STARTER
Augustus C. Durdin, Rockton, and Bernard Kittle and Stephen S. Baits, Rockford, Ill., and Donald F. Swenski, Arvada, Colo., assignors to Sundstrand Corporation, a corporation of Illinois
Original application Aug. 30, 1960, Ser. No. 52,845. Divided and this application Dec. 18, 1964, Ser. No. 422,066
9 Claims. (Cl. 253—59)

This application is a divisional application of copending application Serial No. 52,845 filed August 30, 1960, now abandoned.

The present invention relates to engine starters and more particularly to turbojet aircraft engine starters.

The increasing use of turbojet engines in commercial and military aircraft has produced the need for a lightweight turbojet engine starter which can also have a reasonably long life between overhauls. Most of the starter systems presently used on these engines require associated ground equipment. This is a handicap particularly for military aircraft where there is a definite need to operate from fields which may not have the necessary ground equipment available. In addition, the starters presently used are not easily removed from or replaced on the aircraft.

It is therefore an object of the present invention to provide a new and improved engine starter particularly suited to turbojet engines.

An additional object is to provide an engine starter comprising a gas turbine which may be driven either by compressed air or by the gas produced by the combustion of a fuel.

It is another object of the present invention to provide a fan driven by the turbine wheel of a gas turbine engine starter whereby the aerodynamic drag of the fan limits the rotational velocity of the turbine wheel to prevent it from being damaged by centrifugal force.

It is also an object of the present invention to provide in a gas turbine engine starter, adapted to be driven by an external source of compressed air, a speed sensing device operable to close a valve shutting off the supply of compressesd air whenever the speed of the engine reaches a predetermined value.

A still further object of the present invention is to provide a hot gas turbine engine starter driving a fan wherein the cooler air pumped in by the fan is mixed with the exhaust gases from the turbine wheel to reduce the temperature of such gases before they are expelled from the starter.

Additional objects will become apparent from the following description of the accompanying drawings in which there is illustrated a preferred embodiment of the invention.

In the drawings, FIG. 1 is a schematic drawing illustrating a starter embodying the principles of the present invention;

FIG. 2 is a cross-sectional view taken along a vertical plane through the center of the starter;

FIG. 3 is a cross-sectional view taken approximately along the line A—A in FIG. 2 with the hot gas pipe and relief valve disconnected from the hot gas manifold;

FIG. 4 is a cross-sectional view of the compressed air nozzles, taken at about the line B—B in FIG. 3;

FIG. 5 is a side view of a portion of the turbine wheel blades;

FIG. 6 is a cross-sectional view of the turbine blades taken along the line C—C in FIG. 5;

FIG. 7 is a cross-sectional view of the turbine blades taken along the line D—D in FIG. 6;

FIG. 8 is a side elevation view of the hot gas manifold indicating the position of the nozzle channels and the throat inserts;

FIG. 9 is a cross-sectional drawing of the first hot gas nozzle taken along the line G—G in FIG. 8; and FIG. 10 is a cross-sectional drawing of the second hot gas nozzle taken along the line H—H of FIG. 8.

The relation of the operating elements of the present invention may be understood by reference to FIG. 1. A turbine wheel 30 with blades around its periphery is provided on a turbine shaft 31 to rotate therewith. Turbine shaft 31 is rotationally supported by bearings 32 and 33. A fan 34 is mounted on one end of the shaft 31 adjoining turbine wheel 30. A combustion chamber composed of a base 35 and a cover 36 is provided to contain a charge of solid propellant. An electrical wiring system 37 provides a means for igniting the solid propellant. Gases produced by the combustion of the solid propellant pass down a manifold 38 and through a set of nozzles 39, which direct the flow of gases to rotate turbine wheel 30. A relief valve 40 normally limits the gas pressure in manifold 38 to 850±50 pounds per square inch. The gas pressure produced by the combustion in a solid propellant cartridge (in chamber 35, 36) at minus 65 degrees F. is approximately 700 pounds per square inch while the pressure produced in the cartridge at a temperature of 160 degrees F. is between 1100 and 1200 pounds per square inch. By utilizing a pressure relief valve which limits the gas pressure to approximately 850 pounds per square inch (which is only 150 pounds greater than the gas pressure at minus 65 degrees F.) the nozzles can be designed for this range and an almost constant torque is provided at all temperatures between 160 degrees F. and minus 65 degrees F. The common practice in similar turbine designs at the present time is to design the nozzles for temperatures of approximately 70 degrees F. with the result that the torque drops off rapidly as the temperature decreases and increases excessively as the temperature increases.

Turbine shaft 31 has a gear 49 fixed thereon and meshing with a gear 47 on a helical spline 48. The latter is rigid on a shaft 50 rotatable in bearings 51 and 52 and having a gear 53 fixed thereon. Gear 53 meshes with a gear 54 driving a one-way clutch 45 including an output shaft 46 having a gear 58 thereon adapted for driving connection with a jet engine to be started. The assembly composed of gear 54 and clutch 45 is rotatable in bearings 55 and 56.

In order to lessen the danger of the hot gases, resulting from the combustion of the solid propellant, damaging other parts of the aircraft, surrounding equipment or personnel, the temperature of the exhaust gases is reduced by mixing them with air at ambient temperature. Referring to FIG. 2, fan 34 draws air in through an inlet ducting 41 and expels it through a passage 42 into an outlet ducting 43. The hot exhaust gases are expelled through a passage 44 and are mixed with the exhaust air in the ducting 43 before being expelled overboard.

One of the dangers also present in high speed turbines is the possibility that the centrifugal force produced by excessive rotational velocity may cause portions of the turbine wheel to fracture and fly off. In order to prevent such an occurence, a safety device is incorporated in the present invention. As stated above, the hot gas pressure is limited to about 850 pounds per square inch normally, and in case of emergency is limited to approximately 1200 pounds per square inch. An important purpose of the fan is to produce sufficient aerodynamic drag, when rotated, that the trubine shaft and turbine wheel cannot exceed a predetermined speed, 65,000 revolutions per minute, for example, under any conditions when driven by gas or air.

The present invention provides for not only driving the turbine wheel by hot gases produced from combustion of a solid propellant, but also for driving the turbine wheel from a source of compressed air external to the aircraft. The compressed air is introduced to the blades of the turbine wheel 30 by a compressed air inlet 59, a compressed air manifold 60 and compressed air nozzles 61. The compressed air is exhausted through exhaust passage 44 and exhaust duct 43, in the same manner as the hot gases. A set of flyweights 62 fly outwardly when the speed of output shaft 46 reaches 2850 revolutions per minute. Their outward movement operates a shaft 63 axially, rotating an arm 64 about a pin 65 to operate a switch 66. The operation of switch 66 may be utilized to cause a valve (not shown) to cut off the supply of compressed air to the inlet 59 through a suitable electric circuit (not shown). When the rotational velocity of shaft 46 decreases to approximately 1500 revolutions per minute, the flyweights 62 will return to the position shown in FIG. 1, allowing microswitch 66 to return to its original condition.

Viewing again FIG. 2, the flyweights 62 swing outwardly when the rotational velocity of driven member 183 and shaft 46 exceeds approximately 2850 revolutions per minute. The flyweights 62 are rigidly secured to pivotally mounted arms 195 and 196. The opposite ends of arms 195 and 196 act against one end of slidable rod 63. Under the force produced by the centrifugal force on flyweights 62 when they move outwardly, rod 63 is forced to the left in FIG. 2 against pivotally mounted arm 64 forcing it to turn about pivot 65, thereby compressing spring 198 and closing microswitch 66. Spring 198 is supported by an adjustable collar 199 on a bolt 200 threaded into said collar. The other end of bolt 200 has an adjustment extension 201 secured to it by pin 202. Bolt 200 and bolt extension 201 are supported in axial position in a portion of housing 69 and a threaded cap 203. The actuation of switch 66, when the flyweights sense that the shaft rotational velocity has exceeded 2850 revolutions per minute, shuts off a valve controlling the flow of compressed air to manifold channel 160 through an appropriate electrical circuit, thereby allowing the starter to slow down. If the engine has not started, the valve controlling the flow of compressed air will be reopened when the rotational velocity of shaft 46 has fallen below approxiamtely 1500 revolutions per minute which is the rotational velocity allowing flyweights 62 to return to the position shown in FIG. 2. The rotational velocity at which the flyweights will fly outwardly can be adjusted through rotations of bolt extension 201 which increases the compressive tension on spring 198. The reduction in speed required to cause the flyweights to return to the normal position is a function of the spring rate.

Referring to FIGS. 2 and 3, the compressed air inlet 59 is formed by a ducting member 163. It is secured by a clamping ring 164 to a compressed air manifold comprised of ducting members 161 and 162 welded together. A connector ring 165 is rigidly secured to the outboard end of ducting member 163 for the purpose of connecting with suitable compressed air ducting from an external source of compressed air (not shown). As illustrated in FIG. 3, the compressed air manifold channel 160 formed by the ducting members 161 and 162 supplies compressed air to approximately three-fourths of the circumference of the turbine wheel. The remaining one-fourth of the circumference is utilized by the nozzle and manifold member 75 for supplying hot combustion gases to the wheel. Compressed air from manifold channel 160 is forced through nozzles formed in supporting member 166 by a series of nozzle vanes 167. The vanes may be more clearly seen in FIG. 4, which is a cross section taken along the line B—B in FIG. 3. The nozzles thus formed direct the compressed air against the bucket-shaped wheel blades in the same manner that the turbine wheel can be driven by hot gases from the hot gas nozzles.

As shown in FIG. 5, the turbine blades 168 are an integral part of turbine wheel 30. FIG. 6 shows their cross sections to be that of a bucket shape with a hole down through the center of each blade.

A wire of the electrical wiring system 37 is carried through a handle structure 110 through the top of cover 36 to make contact with the propellant. Another wire is grounded to base 35. When a solid propellant cartridge is placed in the combustion chamber and the cover clamped to the base by handle structure 110 and breech lock 87, there is a completed ignition circuit between the two electrical leads through an igniter means in the top of the cartridge, a metallic cartridge container, and the base 35. For the purpose of igniting the solid propellant cartridge, a switch means connecting a source of electrical potential to the wires is suitably mounted in the aircraft.

A combination nozzle and manifold member 75 which contains the hot gas manifold 38 and the set of nozzles 39 may best be seen in FIGS. 2, 3 and 8.

Referring now to FIG. 2, the turbine wheel 30 is shown rigidly mounted on shaft 31, which is rotationally supported in bearings 32 and 33. The fan 34 is mounted adjacent the wheel 30 on the left end of the shaft 31. When the turbine wheel 30 is rotated, air is drawn in through inlet passage 41 and an annular channel 120 to the fan. The fan 34 exhausts the air through annular outlet passage 42 into an outlet ducting, not shown, which allows the air to be exhausted overboard at a maximum temperature of 950 degrees F. The housing 80 is kept relatively cool by having the cool air inlet passage 41 and the channel 120 located next to the external walls of the housing 80. Therefore, the cooler air provides an insulation against the hot gases expelled through outlet passage 44.

The member 75 is shown secured to housing 69 by a flange portion 121 inserted in a grooved portion of housing 69 and by a flange portion 122 secured against a flange portion 123 of the housing 80 by the U-shaped clamping ring 81. The manifold 38 constructed in nozzle and manifold member 75 has an inner metallic sleeve 124. The relative position of the manifold 38 and the nozzle set 39, which includes channels 126 and 127, are illustrated in FIG. 8. The sleeve 124 is constructed of material which is highly resistant to the erosion brought about by the high temperature gases at pressures up to 850 pounds per square inch. For the purpose of quickly overhauling the manifold, the sleeve 124 may be slidably removed and replaced by another such sleeve. It has been found from experience that cracks may develop in the manifold and the nozzle portions from the uneven heating due to the variations in thickness of the supporting member around the manifold and nozzle throats. In order to prolong the life of the nozzles used in the present invention, the throats of the nozzles, as at 128 (FIG. 9) and 129 (FIG. 10), are made of a material capable of standing high temperatures without cracking. These throat inserts are welded into the member 75. The junction of the insert with member 75 creates a sufficient drop in temperature that the supporting member 75 does not tend to crack because of uneven heating. The manifold portion of member 75 is insulated by having inner sleeve 124 surrounded by an insulation layer 112, which may, for example, be an air gap. The sleeve 124 has sufficient clearance that it can expand as the temperature in the manifold increases and is not required to retain the high pressures. A certain amount of gas will leak around this sleeve into the insulation layer 112. In order to maintain the pressure in the manifold, the member 75 is constructed to be pressure resistant to pressures exceeding 1200 pounds per square inch. To further insulate the entire member 75, an insulation layer 114 surrounds member 75 and is held in position by a cover 115. This is shown only in FIG. 2.

The insert 128 is positioned in nozzle and manifold member 75 with channel 127 to produce a complete nozzle as shown in FIG. 2.

FIG. 10 shows insert 129 with channel 126 completing the second nozzle in member 75.

Referring again to FIG. 2, the hot gases are directed by the nozzles against the blades of the turbine wheel 30 and are exhausted on the left-hand side of the wheel into exhaust passage 44. The exhaust gases pass through channel 44 into an outlet ducting where they are well mixed with the exhaust air coming from fan 34 before being exhausted overboard.

A second safety means to prevent the turbine wheel 30 from reaching excessive speed is provided by one-way clutch 45. If the rotational velocity of the engine shaft connected with gear 58 exceeds the rotational velocity of the gear 54, the clutch prevents the starter from being driven by the engine.

If for any reason clutch 45 should fail to disengage when the engine speed exceeds that of the starter, a further safety means is provided by gear 47 mounted on helical spline gear 48. The helical spline of gear 48 is so oriented in supporting gear 47 that whenever gear 47 is driven by the turbine wheel 30 through shaft 31 and gear 49, the gear 47 tends to remain in mesh with the gear 49. However, whenever the engine speed exceeds that of the starter output shaft 46 to the extent that shaft 50 is driven at a greater rotational velocity (by he engine through gear 53, gear 54, malfunction clutch 45 and shaft 46) than it is driven by the turbine wheel 30 through the gears 48, 47, 49 and shaft 31, the gear 47 will slide (to the right in FIG. 1) on gear 48, disengaging gear 49. In order to prevent gear 47 from disengaging gear 49 because of small engine surges, a shear pin 57 normally secures gear 47 to gear 48. Whenever the torque on shaft 50 produced by the engine exceeds the drag produced by the fan 34 by a predetermined value, pin 57 will shear allowing gear 47 to disengage from gear 49.

The combination of gear 49, gear 47, gear 48, shaft 50, gear 53 and gear 54 provides a reduction gear means which suitably reduces the output rotational velocity of the starter output shaft 46 and increases the torque provided by wheel 30 to start the engine.

The output shaft 46 has a "necked down" section 67 for the purpose of allowing it to shear if the torque produced at this point of the shaft reaches approximately 900 foot pounds. Thus the sear section provides a safety mean to disengage the engine from the starter.

In order to indicate that shear pin 57 has sheared and that gear 47 is out of mesh with gear 49, a pin 68 is provided which will be forced to protrude from a starter housing 69 whenever such a condition exists.

Lubrication for the reduction gears and their supporting shafts is provided by an oil sump 76 and a set of oil slingers 77.

Gear teeth ring 211 rigidly affixed to the housing 69 meshes with gear teeth ring 212 rigidly affixed to the mounting bracket 70. These gears are kept in mesh by the U-shaped clamping ring arcs 71 and 72, which are as described above held by ring 73 and bolt 74. This type of arrangement allows a starter of the type herein described to be quickly mounted or dismounted from the engine. However, an even more important feature of this type of an arrangement is that the meshing ring gear teeth locked together by the arms of the U-shaped clamping ring arcs can withstand a much larger torque than the present conventional means such as pins. The mounting bracket 70 is secured to the engine housing by a series of bolts which are placed through the set of bores 215.

While the structure herein described discloses a preferred embodiment of the present invention, modifications may be made which are within the true scope of the invention. Therefore, it is intended that the invention be limited only by the prior art and appended claims.

We claim:

1. A gas and air propelled engine starter for producing self-sustaining engine rotation comprising a main shaft, turbine wheel means mounted on said shaft, an output shaft driven by said main shaft adapted to be connected to drive said engine, air nozzle means for directing compressed air against said turbine wheel means for rotation thereof, combustion gas nozzle means for directing hot gases against said turbine wheel means for rotation thereof, and a drag fan operatively connected to said main shaft separate from said turbine wheel means for preventing rotation of said turbine above a predetermined speed, said drag fan having inlet ducting means connected to a source of constant low pressure fluid and having outlet ducting means connected to a constant low pressure receiver so that the load imposed on the turbine wheel is a function substantially of only the speed of the turbine wheel.

2. A gas or air driven engine starter for producing self-sustaining rotation of the engine to be started comprising, a main shaft, an output shaft driven by said main shaft adapted to drive said engine, turbine wheel means on said main shaft for rotation thereof, turbine blades on said wheel means adapted to receive either combustion gas or compressed air as the propellant, means for directing hot combustion gas against said turbine blades, means for directing compressed air against said turbine blades, and a drag fan operatively connected to said shaft for preventing turbine rotation above a predetermined overspeed, said drag fan having inlet ducting connected to ambient air and having outlet ducting connected to the ambient air for discharging flow from the fan so that the load on the wheel is substantially a function only of turbine speed.

3. A gas or air driven engine starter for producing self-sustaining rotation of an engine to be started comprising, a main shaft, an output shaft driven by said main shaft adapted to drive said engine, turbine wheel means for rotating said shaft, turbine blades extending radially from said wheel means adapted to receive either a combustion gas or compressed air propellant, combustion gas nozzle means mounted adjacent one side of said blades for directing gas against said blades, compressed air nozzle means mounted adjacent said one side of said blades for directing compressed air against said blades, and a drag fan driven by said main shaft and separate from said blades for preventing excessive rotational velocity of the turbine wheel, said drag fan having inlet ducting means connected to a source of constant low pressure fluid and having outlet ducting means connected to a constant low pressure receiver so that load imposed on the turbine wheel is a function substantially of only the speed of the turbine wheel.

4. A gas or air driven engine starter for producing self-sustaining engine rotation comprising, a housing, a main shaft mounted within said housing, an output shaft driven by said main shaft and adapted to drive said engine, a turbine wheel on said main shaft having radially extending blades extending from the periphery thereof, an arcuate combustion gas nozzle set mounted in the upper portion of said housing adjacent to and on one side of said turbine blades for directing combustion gas against said blades, an arcuate compressed air nozzle set mounted in the lower section of said housing on said one side of said turbine blades, and adjacent thereto for directing compressed air against said turbine blades, and a drag fan driven by said main shaft for preventing turbine rotation above a predetermined speed, said drag fan having inlet ducting connected to ambient air and having outlet ducting connected to the ambient air for discharging flow from the fan so that the load on the wheel is substantially a function only a turbine speed.

5. An air or gas driven engine starter as defined in claim 4 and further including a fan housing surrounding said fan, and an annular turbine exhaust channel in said housing communicating with said gas and compressed air nozzle sets.

6. An air or gas driven engine starter as defined in claim 5 wherein said inlet ducting includes an air intake duct on said fan housing for directing air to said fan, and said outlet ducting includes a fan exhaust duct in said fan housing between said intake duct and said turbine exhaust channel for exhausting air from said drag fan.

7. A gas or air driven engine starter for producing self-sustaining rotation of an engine to be started comprising, a main shaft, an output shaft driven by said main shaft adapted to drive said engine, turbine wheel means on said main shaft for driving said shaft, means for directing compressed air and combustion gas against said turbine wheel means, a drag fan driven by said main shaft for limiting the maximum turbine speed, said drag fan having inlet ducting means connected to a source of constant low pressure fluid and having outlet ducting means connected to a constant low pressure receiver so that the load imposed on the turbine wheel is a function substantially of only the speed of the turbine wheel, a housing surrounding said fan, and an annular exhaust channel in said housing communicating with said means for directing compressed air and combustion gases whereby a common exhaust receives both the compressed air and combustion gases after reacting on the turbine.

8. A gas or air driven engine starter as defined in claim 7 wherein said inlet ducting means includes an air intake duct in said fan housing for delivering air to said drag fan, and said outlet ducting means includes an air exhaust passage in said fan housing between said intake duct and said exhaust channel for exhausting air from said fan.

9. A gas or air driven engine starter for producing self-sustaining engine rotation comprising a housing, a main shaft mounted in said housing, an output shaft driven by said main shaft adapted to be connected to drive said engine, a turbine wheel mounted on said main shaft for driving said shaft, said turbine wheel having radially extending bucket blades on the periphery thereof adapted to receive gas or air as a propellant, an arcuate combustion gas nozzle set mounted in the upper portion of said housing adjacent one side of said turbine blades, said arcuate nozzle set extending less than 180 degrees around said turbine wheel, a source of combustion gas connected to said gas nozzle set, an arcuate compressed air nozzle set mounted in the lower portion of said housing adjacent said one side of said turbine blades, said air nozzle set extending more than 180 degrees around the periphery of said turbine wheel, means for supplying compressed air to said air nozzle set, a drag fan connected to said shaft on the other side of said turbine wheel for preventing rotation of said turbine wheel above a predetermined excessive overspeed, said drag fan having inlet ducting connected to ambient air and having outlet ducting connected to the ambient air for discharging flow from the fan so that the load on the wheel is substantially a function only of turbine speed, a housing surrounding said drag fan, an annular turbine exhaust channel in said fan housing and communicating with both the gas nozzle set and the air nozzle set, said inlet ducting including an air intake duct in said housing for directing air to said fan, and said outlet ducting including a fan exhaust passage in said housing between said turbine exhaust channel and said air intake duct.

References Cited by the Examiner
UNITED STATES PATENTS

| | | | |
|---|---|---|---|
| 1,156,549 | 10/1915 | Perry. | |
| 2,620,627 | 12/1952 | Nardone | 60—39.47 |
| 2,641,442 | 6/1953 | Buchi | 253—65 |
| 2,651,493 | 9/1953 | Volk | 253—59 |
| 2,806,351 | 9/1957 | Kent et al. | 60—39.14 |
| 2,842,937 | 7/1958 | Clark | 60—39.14 |
| 2,913,872 | 11/1959 | Bloomberg | 60—39.14 |
| 3,087,305 | 4/1963 | Hertzog | 60—39.14 |

JULIUS E. WEST, *Primary Examiner.*